Figure 1:
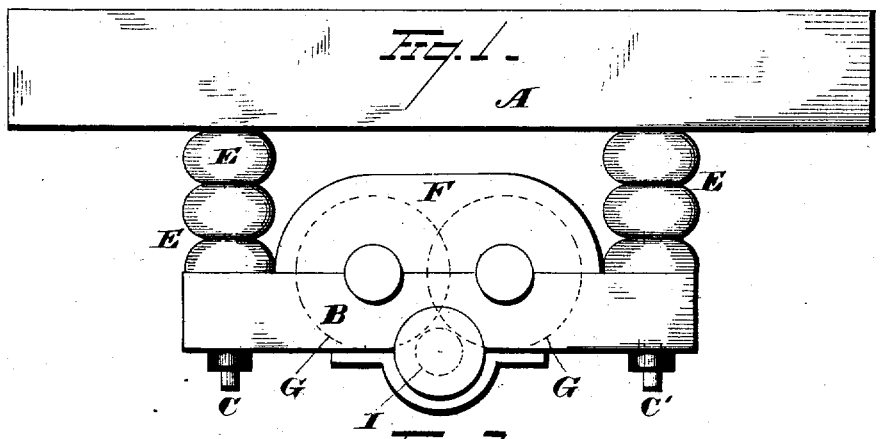

A. HIGLEY,

Assignor to HIGLEY CAR JOURNAL CO.

Car Axle Box.

No. 9,597. Reissued March 8, 1881.

WITNESSES

E. Nottingham

A. M. Bright

INVENTOR

Aaron Higley.

By H. A. Seymour.

ATTORNEY

N. PETERS, PHOTO-LITHOGRAPHER, WASHINGTON, D. C.

UNITED STATES PATENT OFFICE.

AARON HIGLEY, OF CLEVELAND, OHIO, ASSIGNOR TO HIGLEY CAR JOURNAL COMPANY, OF SAME PLACE.

CAR-AXLE BOX.

SPECIFICATION forming part of Reissued Letters Patent No. 9,597, dated March 8, 1881.

Original No. 86,543, dated February 2, 1869; Reissue No. 5,453, dated June 17, 1873; Reissue No. 9,295, dated July 13, 1880.
Application for reissue filed December 21, 1880.

*To all whom it may concern:*

Be it known that I, AARON HIGLEY, of Cleveland, in the county of Cuyahoga and State of Ohio, formerly of South Bend, in the county of St. Joseph and State of Indiana, have invented certain new and useful Improvements in Car-Axle Boxes, and in the means employed for connecting the same to the car; and I do hereby declare that the following is a full, clear, and complete description thereof, reference being had to the accompanying drawings, making part of the same.

My invention relates to an improvement in car-axle boxes.

Heretofore the journal-boxes of car-axle boxes have ordinarily been supported in cast-iron jaws bolted fast to the under side of the car-sills. Between the arms of the depending jaw was placed the journal-box, a spring or springs being interposed between the box and car-sills. This construction was defective for several reasons, viz: The cast-iron jaws were of considerable weight and cost, and added materially to the weight and cost of the car. Again, the upper portion of the jaw being bolted to the sill allowed water to accumulate between the sill and jaws, which resulted in an early decay of the sill; but the prominent defect in such axle-boxes resulted from the arrangement of the journal-box between the jaws, the latter forming guides to allow the box a vertical movement, but preventing any appreciable lateral movement of the journal-box, and hence sudden shocks, more or less severe, would be continually imparted to the car, rendering the latter uncomfortable and disagreeable to the passengers, and also weakening and impairing the strength of the car-body. Again, friction-rollers have been known and used for journal-bearings, and these I do not claim, separately considered; but what distinguishes my improvement and is the nature thereof consists in interlapping friction rolls or rollers arranged in a frame or housing, and forming a box or bearing for railway-car axle-journals, &c.

The object of my invention is to overcome the defective and objectionable features in car-axle boxes constructed as hereinbefore set forth, and to provide car-axle boxes and supporting-frames which shall be of minimum weight and cost, and constructed in such a manner that the frame or bar to which the journal-box is attached, or with which it is connected, may yield freely both vertically and laterally, and thus obviate the transmission of sudden shocks to the car-body.

A further object of my invention is to provide friction rollers or bearings of such construction that the weight of the car will be transmitted over the entire length of the several journals, and thus prevent the latter from being unduly worn at different points thereon, or from being twisted or bent, and thereby rendered useless.

With these ends in view my invention consists, first, in a frame or bar having the journal-box attached thereto or connected therewith, said frame or bar being secured to the car-sill by bolts and springs interposed between the car sill and frame or bar, the construction and arrangement of parts being such that the journal-box may have both vertical and lateral yielding movement, and thereby prevent the transmission of sudden shocks to the car-body.

My invention further consists in the combination, with a frame or bar having a journal-box attached thereto or connected therewith, of bolts secured at one end to the journal-box-supporting frame or bar, and at their opposite ends to the car or truck sill, and springs encircling said bolts, the construction being such that the journal-box-supporting frame may yield both vertically and laterally.

My invention further consists in interlapping friction rolls or rollers arranged and adapted to bear on the axle and distribute the weight equally upon the axle-journal and the journals of the rollers.

Figure 2:
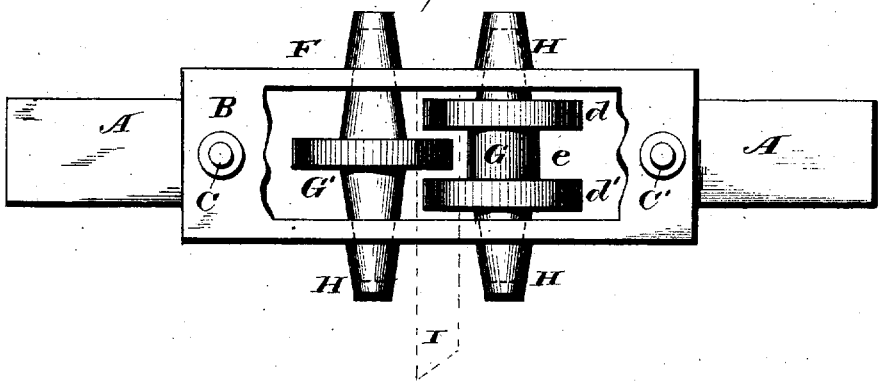
Figure 3:
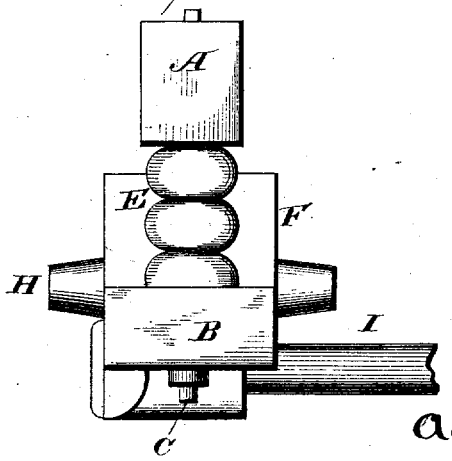

In the accompanying drawings, Figure 1 is a view, in side elevation, of a car-axle box embodying my invention. Fig. 2 is a vertical section of the same. Fig. 3 is a plan view of the under side of the box.

A represents the car or truck sill. B is a frame-piece or bar located beneath the sill and connected therewith by bolts C C′, the latter being inserted through holes D D′, formed in opposite ends of the frame-piece or bar B, and having their upper ends secured in any suitable manner to the sill A. The bolt-holes are of considerably greater diameter than that of the bolts C C′, as is clearly illustrated in Fig. 1, in order to allow the frame-piece or bar to have a horizontal movement both longitudinal and lateral, for a purpose hereinafter explained. Between the frame-piece or bar B and the sill A are interposed the springs E E, which are provided with holes and placed on the bolts C C′, whereby the latter serve as guides to prevent the displacement of said springs.

F is a journal-box case, which is connected with the frame-piece or bar B, the construction herein illustrated being such that one side and bottom of the case may be removed for the admission of the friction-rollers G G′, the axles of which are located transversely in the case. The journals of the rollers G G′ have their bearings in the sides of the box extending through into the projections H.

It will be observed that the roller G is double, or, in other words, there are two rollers, *d d′*, on one shaft and arranged to form a space, *e*, between them, within which intervening space is received the roller G, as shown in the drawings. Rollers G G′ bear upon the axle I, and form the upper half of the bearing for the axle-journal. The weight and friction are equally distributed upon the journals of the said rollers, thereby preventing the bearings or journal-box twisting or turning out of line with the axles, and also preventing the axle-journals from being worn unequally or being twisted out of line. By the interlapping of the rollers the journals thereof are brought more directly over the center of the axles, thereby reducing the friction on all the journals.

In the embodiment of my invention, a pedestal may or may not be used to connect the journal-box to the sill, though it is essential to my invention that the pedestal or frame-piece or bar shall be so connected to the sill that it may yield both vertically and horizontally. As the weight of the car and load is transmitted to the axles through the medium of the springs interposed between the sills and journal-box frame-pieces or bars B, it is obvious that the springs will serve to prevent vertical shocks to the car, as in the ordinary arrangement of car-springs prior to my improvement; but in addition to this result I secure by my improvement another important and valuable result. As has been stated, the frame piece or bar B is allowed to move both laterally and longitudinally, provision being made for such movements by making the bolt-holes of greater diameter than the diameter of the bolts C C′. This horizontal movement of the journal-box and its frame-piece or bar independent of the car-sill, is resisted by the interposed springs, and hence, as the car is turning a sharp curve or meets with some obstruction on a straight line of track, the sudden lateral or longitudinal movement of the journal-box is transmitted to the springs, and the latter, being free to yield laterally as well as vertically, serve to resist in part and counteract the force of the shock to the car, thereby rendering the latter much more comfortable to the passengers, and also preventing any undue wear on the car-body.

As slight changes in the construction and relative arrangement of parts may be resorted to without departing from the spirit of my invention, I would have it understood that I do not restrict myself to the exact construction and arrangement of parts shown and described; but, Having fully described my invention, what I claim as new, and desire to secure by Letters Patent, is—

1. The combination, with a frame or bar having a journal-box attached thereto or connected therewith, of bolts secured at one end to the journal-box-supporting frame or bar, the opposite ends of the bolts being secured to the car or truck sill, and springs interposed between the sill and journal-box-supporting frame or bar, the construction and arrangement of parts being such that said journal-box shall be free to yield both vertically and laterally, substantially as set forth.

2. The combination, with a frame or bar having a journal-box attached thereto or connected therewith, of bolts secured at one end to the journal-box-supporting frame, the opposite ends of the bolts being secured to the car or truck sill, and springs encircling said bolts and interposed between the supporting frame or bar and the sill, the construction and arrangement of parts being such that the journal-box-supporting frame shall be free to yield both vertically and laterally, substantially as set forth.

3. The combination, with a frame or bar having a journal-box attached thereto or connected therewith, of bolts secured at their upper ends to the car or truck sill, and inserted through holes in the opposite ends of the frame or bar, said holes being of greater diameter than the diameter of the bolts, substantially as set forth.

4. The interlapping friction-rollers having two points of bearing for the axle upon one roller, and one point of bearing upon the other, or the equivalent of the same, the object being to throw an equal bearing upon the journals of the friction-rollers, substantially as set forth.

AARON HIGLEY.

Witnesses:
G. W. CROWELL,
A. C. SPEED.